(Model.)

J. E. WHEELDON.
CHURN.

No. 261,973. Patented Aug. 1, 1882.

Witnesses.
Franck L. Ourand
Wm. L. Spidow

John E. Wheeldon,
Inventor.
By Frank A. Fouts
Att'y.

UNITED STATES PATENT OFFICE.

JOHN E. WHEELDON, OF SOUTH CARROLLTON, KENTUCKY.

CHURN.

SPECIFICATION forming part of Letters Patent No. 261,973, dated August 1, 1882.

Application filed March 8, 1882. (Model.)

*To all whom it may concern:*

Be it known that I, JOHN E. WHEELDON, a citizen of the United States, residing at South Carrollton, in the county of Muhlenburg and State of Kentucky, have invented a new and useful Improvement in Churns, of which the following is a specification, reference being had to the accompanying drawings.

My invention relates to churns.

It consists in the parts which will be hereinafter described, and pointed out in the claims.

Figure 1:
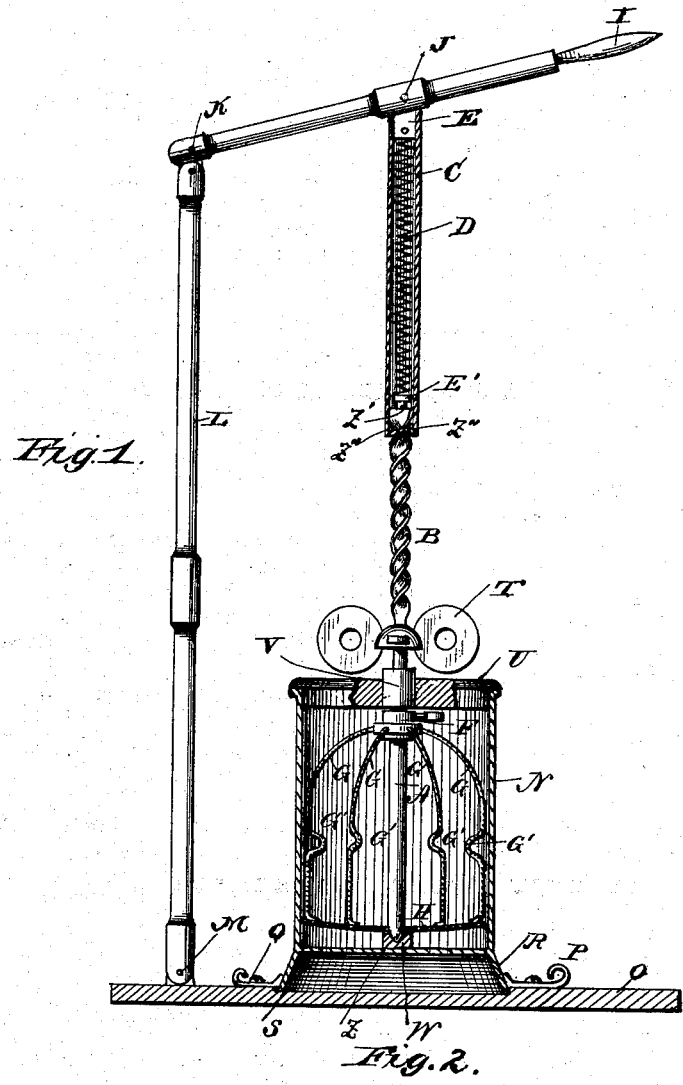
Figure 2:
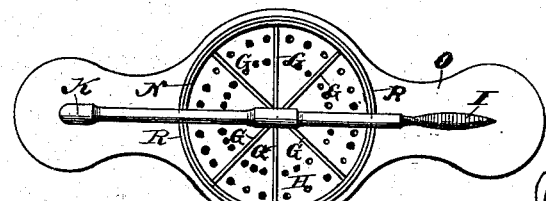

In the accompanying drawings, Figure 1 is side elevation, partly in section. Fig. 2 is a plan view of the device with the vessel-cover removed.

The letter A represents the smooth part of the rotary rod confined within the vessel.

B is the grooved or threaded end of the rotary rod.

C is a tube containing spring D.

E is a plug in the top of the tube, to which the spring is attached.

E' is a sliding socket-plug, to which the lower end of the spring is fixed.

F is a collar and set-screw adjustable on rod A.

G G are beaters, terminating conically on collar F and rigidly secured thereto.

G' G' are U-shaped depressions in beaters G G, which produce increased agitation of the milk.

H is a revolving perforated disk soldered to the lower ends of the wire beaters G G. Said disk has a central opening, through which the rod A passes.

I is the handle.

J is a rivet connecting a piece which is attached by pivot to the top of the tube.

K is the point at which the handle I is attached to a standard, L.

M is a pivot securing the standard to the bottom piece, O.

P and Q are keys fixed to said bottom piece, and which secure the vessel N by its flaring bottom R.

S is a circular recess in the bottom piece, O, into which the flaring bottom of the vessel sits.

T is a fan, adjustable by set-screw on the rotary rod.

U is the vessel-cover, and V is the central collar on said cover, through which the rotary rod passes.

W is a socket-plate rigidly attached to the bottom of the vessel.

Z and Z' are the tapering ends of the rotary rod, that work in the sockets W and E', respectively.

Z'' Z'' are inwardly-projecting pins or lugs rigidly fixed to the bottom of tube C, which slide in the spiral grooves of the rod and cause the same to revolve when the tube is raised or lowered.

The churn is operated by pressing down on the handle, which action forces the vertical tube downward on the grooved dasher-rod. The tube being fixed to the handle, and being provided with inwardly-projecting pins which fit into the grooves in the rod, said rod is forced to revolve by the downward motion of the tube, and to revolve in a reverse manner when the handle and tube are raised. The spring in the tube forces the handle and tube upward after the downward stroke has been performed. By this means a rotary motion is imparted to the dasher.

I claim as new and desire to secure by Letters Patent—

1. The perforated dish-shaped disk H, having a central opening therein, through which the rod A passes, the beaters G, provided with inward depressions G', said beaters being secured and arranged at equidistant points around the outer edge of the disk, the upper ends of the beaters being centered on and rigidly secured to a sliding collar encircling rod A, said collar being provided with a hole for the reception of a set-screw, and by means thereof the collar, beaters, and disk are rendered adjustable on the rod, in the manner and for the purposes specified.

2. In a rotary churn, as herein specified, the fan T, consisting of two vertical metallic wings rigidly secured to a collar, said collar encircling the main shaft and being adjustable thereon by means of a set-screw, for the purposes set forth.

3. The vessel N, provided with cover U, and having flaring bottom, R, said bottom fitting a corresponding recess in the base-piece, and being secured thereto by keys P and Q, in combination with the standard L and the handle I, which is secured to the tube C, the parts being united in the manner and for the purposes specified.

JOHN E. WHEELDON.

Witnesses:
J. M. JOHNSON,
A. A. STUART.